United States Patent
Kimura

(10) Patent No.: US 8,599,743 B2
(45) Date of Patent: Dec. 3, 2013

(54) METHOD, APPARATUS, AND SYSTEM FOR REDUCING POWER CONSUMPTION IN A MESH NETWORK

(75) Inventor: Sadahiro Kimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 372 days.

(21) Appl. No.: 12/946,038

(22) Filed: Nov. 15, 2010

(65) Prior Publication Data

US 2011/0116402 A1    May 19, 2011

(30) Foreign Application Priority Data

Nov. 17, 2009 (JP) ................................ 2009-262237
Jun. 17, 2010 (JP) ................................ 2010-138332

(51) Int. Cl.
*H04W 52/02* (2009.01)
*H04W 52/46* (2009.01)

(52) U.S. Cl.
USPC ........... 370/318; 370/311; 370/400; 370/422; 455/13.4; 455/422.1; 455/522; 713/320; 709/243; 709/244

(58) Field of Classification Search
USPC .............. 370/310.2, 318, 328–339, 349, 400, 370/422; 455/13.4, 127.1, 422.1, 522, 572, 455/573; 713/300, 310, 321, 322, 323, 324, 713/330, 340; 709/239–244
See application file for complete search history.

(56) References Cited

U.S. PATENT DOCUMENTS

| | | | |
|---|---|---|---|
| 6,697,337 B1 * | 2/2004 | Cafarelli et al. | ............. 370/253 |
| 6,735,448 B1 | 5/2004 | Krishnamurthy et al. | |
| 7,280,483 B2 * | 10/2007 | Joshi | .............................. 370/238 |
| 7,630,326 B1 * | 12/2009 | Shear | ............................. 370/254 |
| 2003/0016803 A1 * | 1/2003 | Schmid et al. | ........... 379/201.01 |
| 2003/0165127 A1 | 9/2003 | Fujiwara et al. | |
| 2006/0007863 A1 * | 1/2006 | Naghian | ....................... 370/238 |
| 2006/0185013 A1 * | 8/2006 | Oyama et al. | .................... 726/21 |
| 2006/0206857 A1 * | 9/2006 | Liu et al. | ....................... 717/104 |
| 2007/0066315 A1 | 3/2007 | Kado | |
| 2008/0010385 A1 * | 1/2008 | Lee et al. | ....................... 709/241 |
| 2008/0019328 A1 * | 1/2008 | Rudnick | ....................... 370/337 |
| 2008/0132264 A1 | 6/2008 | Krishnamurthy et al. | |
| 2009/0046712 A1 * | 2/2009 | Nordmark et al. | ............ 370/389 |
| 2009/0181621 A1 * | 7/2009 | Kimura | ........................... 455/69 |

FOREIGN PATENT DOCUMENTS

| | | |
|---|---|---|
| EP | 1341346 A2 | 9/2003 |
| JP | 2006-525694 | 11/2006 |
| JP | 2007-74564 | 3/2007 |
| JP | 2008-61171 | 3/2008 |

(Continued)

OTHER PUBLICATIONS

Mar. 15, 2011 European search report in connection with counterpart European patent application No. 10 25 1943.

(Continued)

*Primary Examiner* — Hoon J Chung
(74) *Attorney, Agent, or Firm* — Cooper & Dunham LLP

(57) ABSTRACT

In a network of wireless communications apparatuses connected by a plurality of routes, a wireless communications apparatus includes a packet generating unit that generates a packet for each of the plurality of routes in the network; an operating unit that generates power consumption information for each of the routes, the power consumption information indicating power consumption for transmitting the packets; an attaching unit that attaches the power consumption information to the packets; and a transmit unit that transmits the packets to which the power consumption information is attached via the corresponding routes.

7 Claims, 15 Drawing Sheets

(56) References Cited

FOREIGN PATENT DOCUMENTS

| JP | 2008-219526 | 9/2008 |
| JP | 2008-312017 | 12/2008 |
| JP | 2009-11803 | 5/2009 |
| WO | WO02/41521 A2 | 5/2002 |

OTHER PUBLICATIONS

Tsudaka, Kentaro, et al. (2001), "Power Control Routing for Multi Hop Wireless Ad-hoc Network," IEEE, vol. 5, pp. 2819-2824.
Japanese official action dated Sep. 3. 2013 in corresponding Japanese patent application No. 2010-138332.

* cited by examiner

FIG.5

| NODE | TX POWER |
|---|---|
| 2 | −45dBm |
| 3 | −30dBm |

FIG.6

| TX POWER | POWER CONSUMPTION |
|---|---|
| −50dBm | 120mW |
| −45dBm | 130mW |
| −40dBm | 140mW |
| −35dBm | 150mW |
| −30dBm | 160mW |
| −25dBm | 180mW |
| −20dBm | 200mW |
| −15dBm | 220mW |
| −10dBm | 230mW |
| 0dBm | 250mW |

METHOD, APPARATUS, AND SYSTEM FOR REDUCING POWER CONSUMPTION IN A MESH NETWORK

BACKGROUND OF THE INVENTION

1. Field of the Invention

The present invention generally relates to methods, apparatuses, and systems for reducing power consumption in a mesh network. The present invention also relates to a wireless communications program and a non-transitory recording media storing a wireless communications program.

2. Description of the Related Art

With the progress of wireless technologies, devices that have been connected using wires are increasingly connected wirelessly. For example, Ethernet networking technology according to the IEEE 802.3 standard has been the mainstream technology for local area networks (LAN). However, in recent years, wireless LAN connection technology according to the IEEE 802.11 standards has been adopted in increasing number of information communications devices. Wireless communications technologies, due to the high degree of freedom they offer, are expected to be used in realizing mesh networks that are dynamically configured.

Patent Documents 1 and 2 discuss route-search ("routing") technologies for mesh networks. The technologies are discussed to be capable of minimizing the number of hops in a network. The technologies according to Patent Documents 1 and 2, however, do not take into consideration the power consumption by an entire network, and therefore do not attempt to overcome a problem of excessive power consumption in the network.

Patent Document 1: JP 2007-74564A
Patent Document 2: JP 2008-219526A

SUMMARY OF THE INVENTION

The disadvantages of the prior art may be overcome by the present invention which, in one aspect, is a wireless communications apparatus in a network of a plurality of the wireless communications apparatuses connected by a plurality of routes. The apparatus includes a packet generating unit configured to generate a packet for each of the plurality of routes in the network; an operating unit configured to generate power consumption information for each of the routes, the power consumption information indicating power consumption for transmitting the packet; an attaching unit configured to attach the power consumption information to the corresponding packet; and a transmit unit configured to transmit the packets to which the power consumption information is attached via the corresponding routes.

In another aspect, the invention provides a wireless communications apparatus in a network of a plurality of the wireless communications apparatuses connected by a plurality of routes. The apparatus includes a receiving unit configured to receive a packet to which power consumption information is attached, the power consumption information indicating power consumption for transferring the packet in the network; an acquiring unit configured to acquire the power consumption information attached to the packet received by the receiving unit; and a decision unit configured to determine one of the plurality of routes that has the minimum power consumption by comparing the power consumption information acquired by the acquiring unit regarding one route with that of another route in the network.

In another aspect, the invention provides a network communications system having a transmitting wireless communications apparatus, a receiving wireless communications apparatus, and a plurality of interposed wireless communications apparatuses. The transmitting communications apparatus includes a packet generating unit configured to generate a packet for each of the plurality of routes in the network; an operating unit configured to generate power consumption information for each of the routes, the power consumption information indicating power consumption for transmitting the packet; an attaching unit configured to attach the power consumption information to the corresponding packet; and a transmit unit configured to transmit the packets to which the power consumption information is attached via the corresponding routes. The receiving wireless communications apparatus includes a receiving unit configured to receive a packet to which power consumption information is attached, the power consumption information indicating power consumption for transferring the packet in the network; an acquiring unit configured to acquire the power consumption information attached to the packet received by the receiving unit; and a decision unit configured to determine one of the plurality of routes that has the minimum power consumption by comparing the power consumption information acquired by the acquiring unit regarding one of the routes with that of another of the routes in the network.

In yet another aspect, the invention provides a communications method for a network having a transmitting wireless communications apparatus, a receiving wireless communications apparatus, and a plurality of interposed wireless communications apparatuses. The method includes generating a packet in the transmitting wireless communications apparatus for each of a plurality of routes of the network; generating power consumption information for each of the routes, the power consumption information indicating power consumption by the transmitting wireless communications apparatus for transmitting the packet; attaching the power consumption information to the corresponding packet; transmitting the packets to which the power consumption information is attached from the transmitting wireless communications apparatus via the corresponding routes; and receiving by the receiving wireless communications apparatus the packets transmitted in the transmitting step to which other power consumption information is attached. The other power consumption information indicates power consumed by transferring of the packet in the network. The method also includes acquiring the power consumption information attached to the received packets in the receiving wireless communications apparatus; and determining in the receiving wireless communications apparatus one of the plurality of routes in the network that has the minimum power consumption by comparing the power consumption information of one of the routes with that of another of the routes.

BRIEF DESCRIPTION OF THE DRAWINGS

FIG. 5 illustrates a table associating the nodes with transmission power;

FIG. 6 illustrates a table associating transmission power with power consumption;

DETAILED DESCRIPTION OF THE PREFERRED EMBODIMENTS

Figure 1:
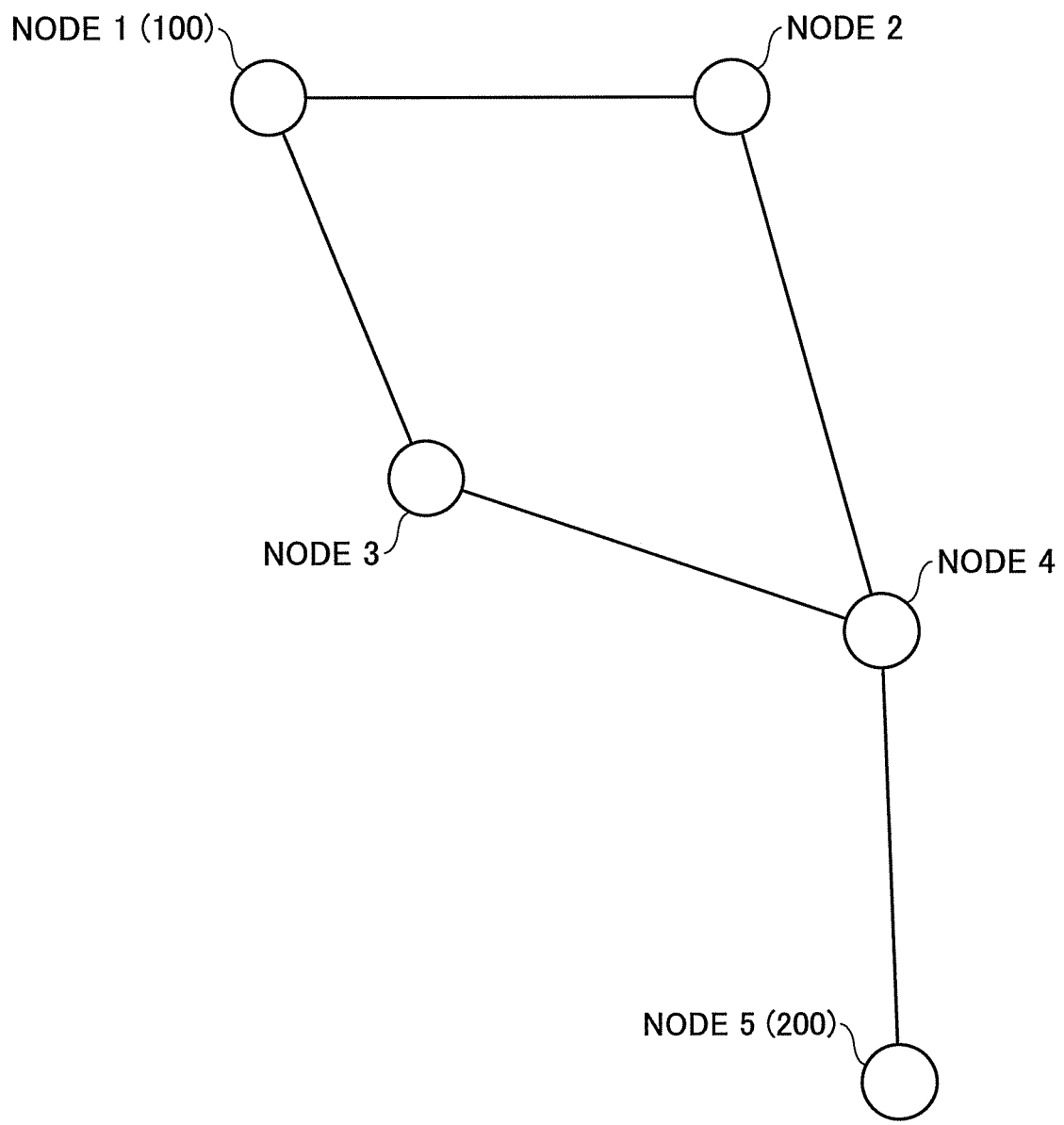
FIG. 1 illustrates a mesh network.

FIG. 1 illustrates a mesh network including nodes 1 through 5. The mesh network (which may be hereafter simply referred to as a "network") may be used in a small-sized office. The nodes 1 through 5 correspond to wireless communications apparatuses. The "wireless communications apparatus" herein refers to an apparatus for transmitting and receiving information or data wirelessly. Examples of wireless communications technologies include wireless LAN according to the IEEE 802.11x standard, and a wireless communications protocol according to the IEEE 802.15.1 standard, such as Bluetooth and ZigBee (registered trademark).

The wireless communications apparatus at node 1 may be connected to, or implemented by, a personal computer (PC) of a user, such as an employee of an office. The wireless communications apparatus at node 1 is referred to as a transmitting wireless communications apparatus 100. The wireless communications apparatus at node 5 may be connected to, or implemented by, an image forming apparatus. The wireless communications apparatus at node 5 is referred to as a receiving wireless communications apparatus 200.

The wireless communications apparatuses at nodes 2 through 4 are referred to as interposed wireless communications apparatuses 50. The interposed wireless communications apparatuses 50 may be used for relaying or transferring data such as a data packet. The interposed wireless communications apparatuses 50 may be connected to or implemented by devices or apparatuses (such as PCs) of other users, such as other office employees.

The transmitting wireless communications apparatus 100 (node 1) transmits data such as image data generated on the user's PC to the receiving wireless communications apparatus 200 (node 5) via nodes 2 through 4. The receiving wireless communications apparatus 200 at node 5 may subject the image data to an image forming process. Hereafter, the term "node" and the term "wireless communications apparatus" may be used interchangeably.

The transmitting wireless communications apparatus 100 knows an address, such as an IP address, of the receiving wireless communications apparatus 200. All of the nodes know the addresses of adjacent nodes. For example, node 1 knows the addresses of nodes 2 and 3, and node 2 knows the address of node 4, and so on. Further, the nodes know a transmission power required for transmitting data, such as a data packet, to adjacent nodes. For example, node 1 knows the transmission power required for transmitting a packet to nodes 2 and 3, and node 2 knows the transmission power for transmitting a packet to node 4.

Transmitting Wireless Communications Apparatus

Figure 2:
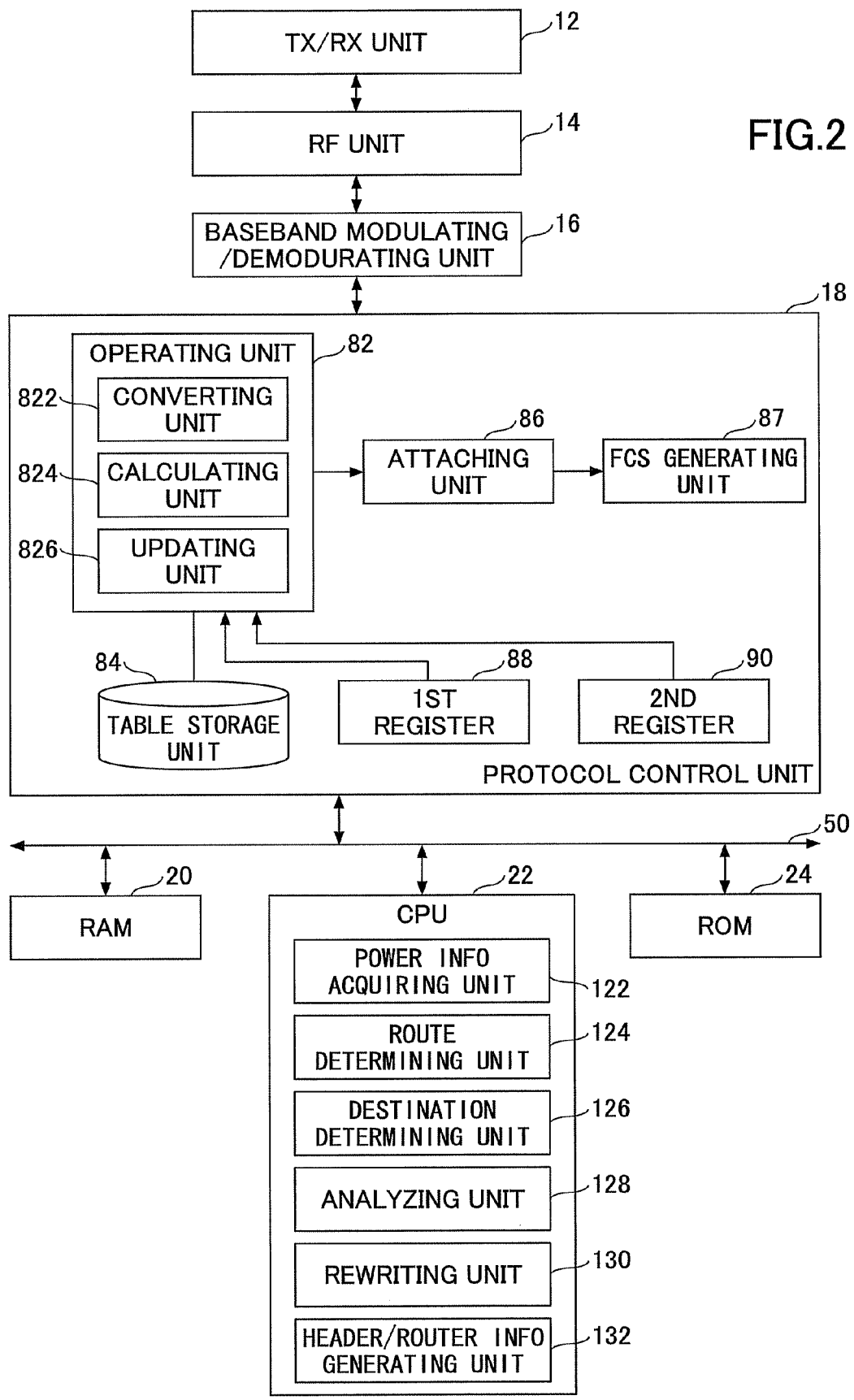
FIG. 2 is a functional diagram of a wireless communications apparatus according to an embodiment of the present invention.

FIG. 2 is a functional block diagram of the transmitting wireless communications apparatus 100. The transmitting wireless communications apparatus 100 includes a transceiver unit 12, a RF unit 14, a baseband modulating/demodulating unit 16, a protocol control unit 18, a RAM (random access memory) 20, a CPU (central processing unit) 22, and a ROM (read-only memory) 24. The protocol control unit 18, the RAM 20, the CPU 22, and the ROM 24 are connected via a bus 50. The functional structure illustrated in FIG. 2 is common to the interposed wireless communications apparatuses 50 at nodes 2 through 4 and the receiving wireless communications apparatus 200 (node 5).

A wireless communications method according to an embodiment of the present invention includes a route-determining step and a real data transmit step. After a route is determined in the route-determining step, real data (such as image data) is transmitted in the real data transmit step.

Route-Determining Step

In the route-determining step, the transmitting wireless communications apparatus 100 (node 1) generates a routing packet and wirelessly transmits it. The routing packet is desired to be eventually received by the receiving wireless communications apparatus 200 (node 5). The routing packet is generated for each route between node 1 and node 5. In the network illustrated in FIG. 1, there are two routes between nodes 1 and 5. One route connects nodes 1 and 5 via nodes 2 and 4. The other route connects nodes 1 and 5 via nodes 3 and 4. Thus, a routing packet A is generated for the one route and a routing packet B is generated for the other route by the transmitting wireless communications apparatus 100.

Method of Generating a Routing Packet

Figure 3:
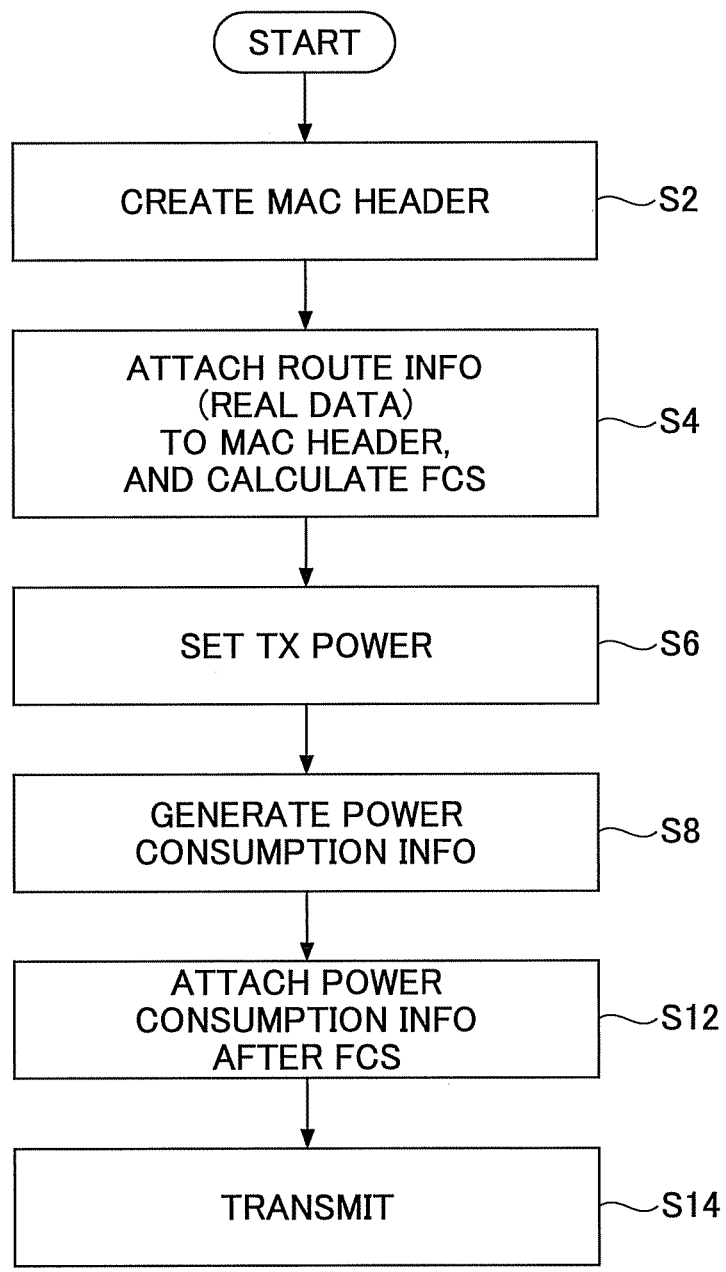
FIG. 3 is a flowchart of a process performed by a transmitting wireless communications apparatus.
Figure 4:
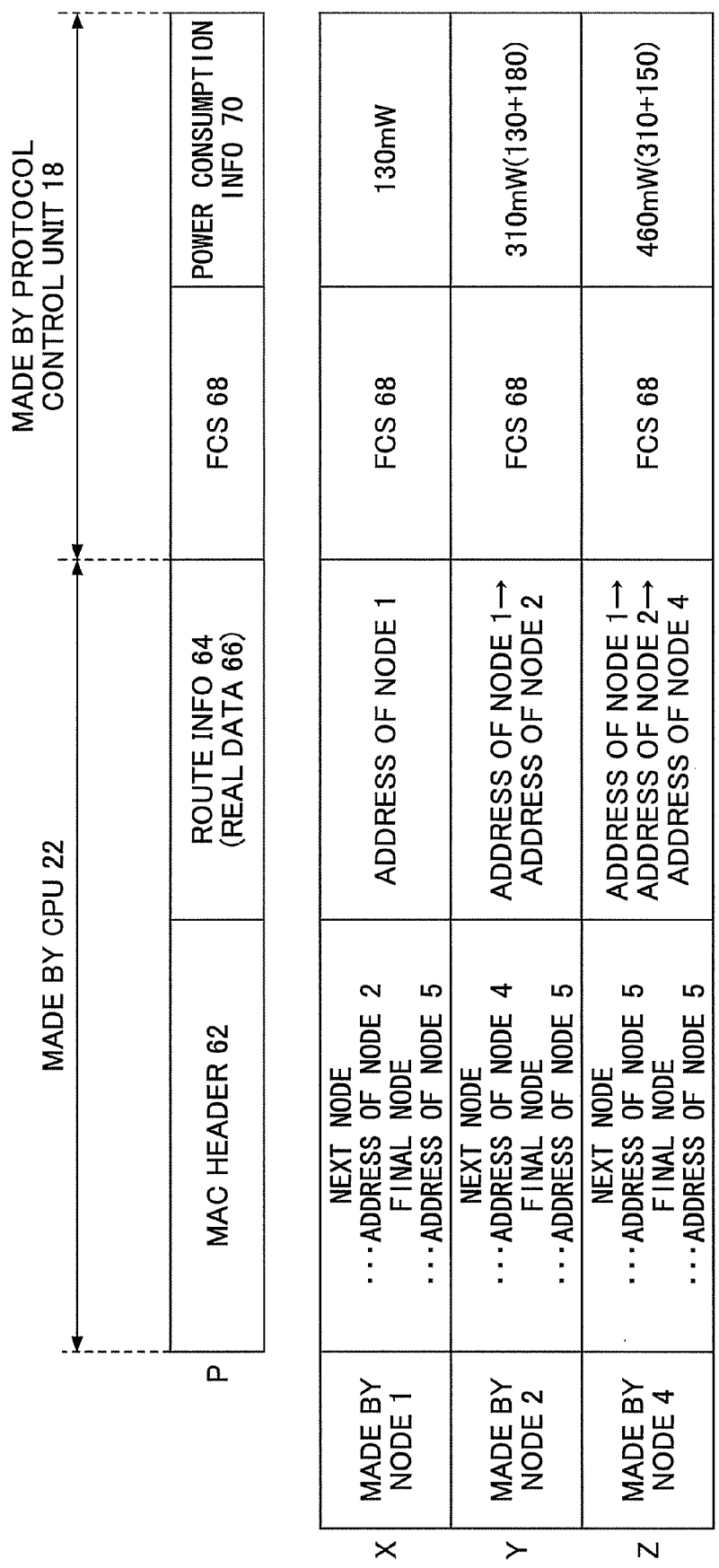
FIG. 4 illustrates a packet.

FIG. 3 is a flowchart of a routing packet generating process performed by node 1. FIG. 4 illustrates a format of a routing packet P generated by node 1 or by any of nodes 2 through 4. FIG. 4 also illustrates examples of data items contained in the routing packet P generated by nodes 1 (X), 2 (Y), and 4 (z).

The process of FIG. 3 is described with reference to a case where the transmitting wireless communications apparatus 100 generates the routing packet A for the route including nodes 1, 2, 4, and 5. First, a header/routing info generating unit 132 (see FIG. 2) of the CPU 22 of the transmitting wireless communications apparatus 100 (node 1) generates a MAC header 62 in the RAM 20 (step S2). The MAC header 62 generated at node 1 ("X") of FIG. 4 includes the address of the next node (node 2) and the address of the final node 5 (receiving wireless communications apparatus 200). The "next node" may be an interposed wireless communications apparatus 50 or the receiving wireless communications apparatus 200.

The header/routing info generating unit 132 of the CPU 22 then generates route information 64 in the RAM 20. The route information 64 is then attached to the MAC header 62. The route information 64 indicates a route from the node (node 1) that initially transmitted the routing packet to the current node. For example, the route information 64 generated at node 1 (X) includes the address of node 1. Then, a FCS generating unit 87 of the protocol control unit 18 calculates a FCS (frame check sequence) 68 (step S4).

Thus, the MAC header 62 and the route information 64 are generated by the header/routing info generating unit 132 of the CPU 22, while the FCS 68 is generated by the FCS generating unit 87 of the protocol control unit 18. At this point, the packet does not yet include power consumption information. Such a packet prior to the addition of power consumption information may be referred to as "non-power-consumption-information-attached packet". Namely, the non-power-consumption-information-attached packet is generated by the header/routing info generating unit 132 of the CPU 22 and by the FCS generating unit 87 of the protocol control unit 18. Thus, the header/routing info generating unit 132 and the FCS generating unit 87 may be collectively referred to as a "packet generating unit". The packet generating unit generates the non-power-consumption-information-attached packets for the route including nodes 1, 2, 4, and 5 and the route including nodes 1, 3, 4, and 5. The packet generating unit may be configured to generate non-power-consumption-information-attached packets for all of the routes.

Next, the CPU 22 sets a transmission power in a first register 88 of the protocol control unit 18 (step S6). The CPU 22 of all nodes may retain a table 70 in advance. In the table 70, the adjacent nodes are associated with transmission power values for transmitting a packet to the adjacent nodes. FIG. 5 illustrates an example of the table 70, showing the transmission power required for transmitting a packet from the transmitting wireless communications apparatus 100 (node 1) to the adjacent nodes 2 and 3. For example, the transmission power required for transmitting a packet from node 1 to node 2 is −45 dBm. The transmission power required for transmitting a packet from node 1 to node 3 is −30 dBm.

Thus, when the routing packet A is generated by node 1, the corresponding transmission power is −45 dBm. Therefore, the CPU 22 sets the information in the first register 88 of the protocol control unit 18, indicating that the transmission power is −45 dBm (step S6). The protocol control unit 18 sends the transmission power information stored in the first register 88 to the RF unit 14. The table 70 may be created by determining the transmission power for each node in accordance with the following equation:

$$E = \alpha dr \qquad (1)$$

where E is the transmission power, α is a constant, d is the distance (communications distance) between the nodes, and r is a constant of 2 to 4.

Next, an operating unit 82 of the protocol control unit 18 generates power consumption information for each route (step S8). The power consumption information indicates a value of power consumption involved in the transmission (or transfer) of the routing packet A to the adjacent node (node 2 in the present example). The power consumption information may be generated by various methods. In the following, two methods of generating the power consumption information from the transmission power information stored in the first register 88 are described.

In the first method, a converting unit 822 in the operating unit 82 and a table 80 are used. An example of the table 80 is illustrated in FIG. 6, in which transmission power information and power consumption information are associated with each other. For example, when the transmission power is −50 dBm, the corresponding power consumption is 120 mW. The table 80 may be generated and stored in the table storing unit 84 in advance. Because the transmission power for transmitting the packet from node 1 to node 2 is −45 dBm, the converting unit 822 converts the transmission power information (−45 dBm) to power consumption information indicating 130 mW by referring to the table 80.

In the second method, a calculating unit 824 of the operating unit 82 calculates power consumption information from the transmission power information in the first register 88 in accordance with a predetermined calculation formula. The predetermined calculation formula may be experimentally determined from transmission power values and power consumption values corresponding to the transmission power values in advance. The calculation formula may be retained in the calculating unit 82. The power consumption information may be generated by other methods.

By using the first method that utilizes the table 80, calculation cost or processing load may be reduced. By using the second method involving a calculation formula, power consumption information corresponding to transmission power information that is not specified in the table 80 may be calculated. For example, the second method may enable the determination of an appropriate power consumption value when the exact transmission power, such as a value of −47 dBm, is not described in the table 80.

The MAC header 62 and the route information 64 generated on the RAM 20 are transmitted to the protocol control unit 18. In step S12 (FIG. 3), the attaching unit 86 attaches the power consumption information 70 after the FCS 68. Namely, the power consumption information 70 is included in the routing packet, thus obtaining the routing packet illustrated in FIG. 4. The routing packet A is then transmitted to a baseband modulating/demodulating unit 16. The baseband modulating/demodulating unit 16 subjects the routing packet A to an OFDM (orthogonal frequency-division multiplexing) digital modulation process. After the OFDM process, the routing packet A is transmitted to node 2 by a transceiver unit 12.

Flow of Routing Packet in a Network

Figure 7:
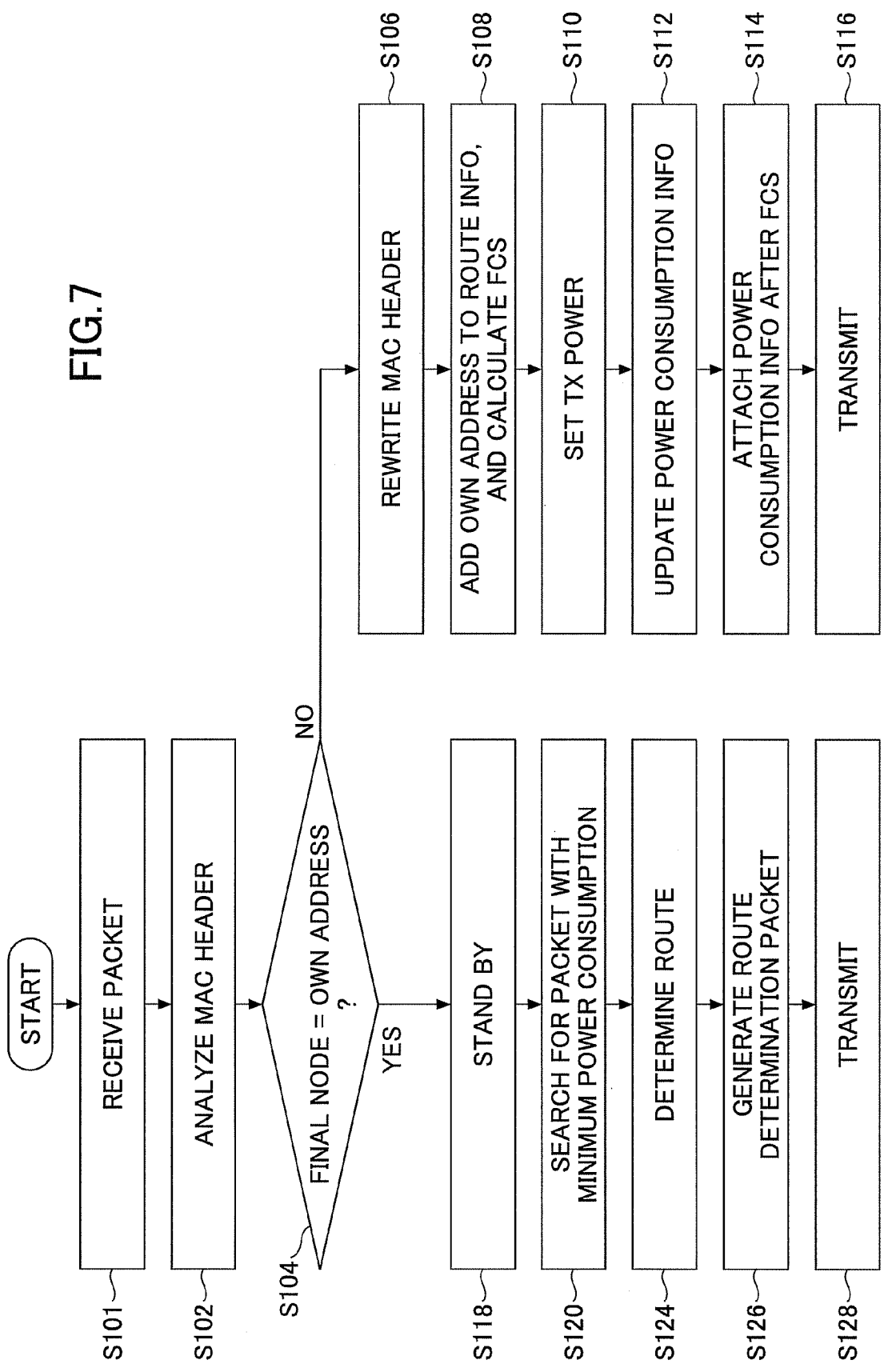
FIG. 7 is a flowchart of a process performed by an interposed wireless communications apparatus or a receiving wireless communications apparatus.
Figure 8:
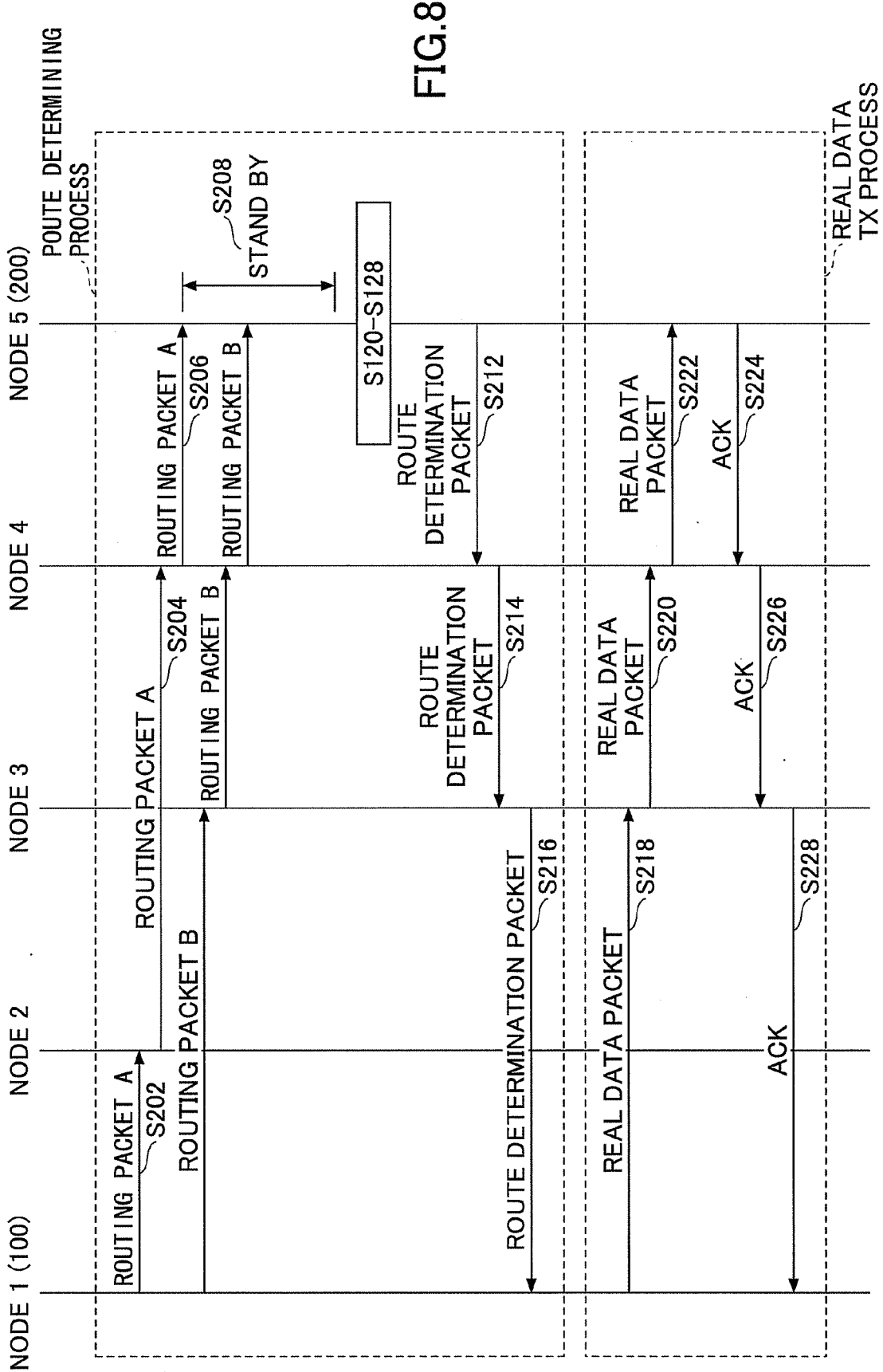
FIG. 8 illustrates the flow of a packet in a network.

FIG. 7 is a flowchart of a process flow between the interposed wireless communications apparatuses 50 (nodes 2 through 4) and the receiving wireless communications apparatus 200 (node 5). A flow of the routing packet is illustrated in FIG. 8. The functional structure of the nodes 2 through 5 may be the same as illustrated in FIG. 2.

Node 1 transmits the routing packet A to node 2 (step S202 of FIG. 8). The transceiver unit 12 of node 2 receives the routing packet A (step S101 of FIG. 7). The transceiver unit 12 provides the received routing packet A to the RF unit 14. The routing packet A is thereafter stored in the RAM 20 via the baseband modulating/demodulating unit 16 and the protocol control unit 18.

The analyzing unit 128 of the CPU 22 analyzes the MAC header 62 contained in the routing packet A (step S102), and acquires the addresses of nodes 2 and 5. Then, a destination determining unit 126 of the CPU 22 determines whether the address of the final node 5 corresponds to the address of the current node, i.e., node 2 (step S104). Because the address of the final node 5 does not correspond to the address of node 2 (NO in S104), the process advances to step S106.

In step S106, a rewriting unit 130 of the CPU 12 rewrites the MAC header 62 of the routing packet A stored in the RAM 20. Specifically, the address of node 2 shown in the MAC header 62 of the packet (X) in FIG. 4 is replaced with the address of the next node (node 4), as shown in the MAC header 62 generated by node 2 (Y). As a result, the routing packet A is transmitted from node 2 to node 4.

Further, the rewriting unit 130 of node 2 updates the route information 64 by attaching the address of node 2. As a result of the updating, the route information 64 indicates that the route is from node 1 to node 2. For example, the route information 64 is updated from "address of node 1" to "address of node 1→address of node 2". Thereafter, the FCS generating unit 87 of the protocol control unit 18 generates the FCS 68 in step S108.

The power information acquiring unit 122 of the CPU 22 acquires the power consumption information 70 in the routing packet A stored in the RAM 20. The power consumption information 70 is then stored in a second register 90.

In step S110, as described above with reference to "Method of Generating a Routing Packet", the CPU 22 sets transmission power information in the first register 88 of the protocol control unit 18. The transmission power information indicates the amount of electric power required for wirelessly transmitting the routing packet A to the next node (node 4). The operating unit 82 generates power consumption information based on the transmission power information stored in the first register 88. The power consumption information may be generated by various methods, such as the above-described first or the second method. For example, the power consumption for wireless transmission of the packet from node 2 to node 4 may be 180 mW.

In step S112, an updating unit 826 of the operating unit 82 adds the power consumption value of 180 mW for wireless transmission from node 2 to node 4 to the power consumption value of 130 mW stored in the first register 88. Then, the updating unit 826 updates the power consumption information 70 with the added result, i.e., a power consumption value of 310 mW. Thus, the operating unit 82 of node 2 (interposed wireless communications apparatus) generates the power consumption information by summing the power consumption value generated from the transmission power required for transmitting the routing packet from node 1 to node 2, and the power consumption value generated from the transmission power required for transmitting the packet from node 2 to node 4 (another interposed wireless communications apparatus) or node 5 (receiving wireless communications apparatus 200).

In step S114, the thus updated power consumption information 70 is attached after the FCS 68 by the attaching unit 86, thus including the power consumption information 70 in the routing packet A. The routing packet A with the updated power consumption information is then processed by the baseband modulating/demodulating unit 16, converted into a wireless signal by the RF unit 14, and then transmitted to node 4 by the transceiver unit 12 (step S116 and step S204).

The processes of steps S101 through S116 are also performed by node 4. Node 4 sets a power consumption value of 150 mW corresponding to the transmission power that is set for the transmission of the packet from node 4 to node 5. The wireless communications apparatus of node 4 changes the "Next node" information in the MAC header 62 from the address of node 2 to the address of node 5, as illustrated in FIG. 4 (z). Further, the route information 64 is updated from "address of node 1→address of node 2" with "address of node 1→address of node 2→address of node 4". Also, the power consumption information 70 is updated to 310+150=460 mW.

The routing packet A containing the information indicated by "z" in FIG. 4 with the updated power consumption information and the like is transmitted to node 5 (receiving wireless communications apparatus 200). Total power consumption for transmitting the packet from node 1 to node 5 is 460 mW. On the other hand, when the routing packet B is transmitted via the route of nodes 1, 3, 4, and 5, a total power consumption for transmitting the routing packet B is 400 mW.

Thus, the transceiver unit of an interposed wireless communications apparatus 50 transfers the routing packet to the next interposed wireless communications apparatus 50 or the receiving wireless communications apparatus 200.

Receiving Wireless Communications Apparatus Route-Determining Step

A process performed by the receiving wireless communications apparatus 200 (node 5) is described with reference to the flowchart of FIG. 7. In step S101, the receiving wireless communications apparatus 200 receives the routing packets A and B from node 4. The routing packets A and B are stored in the RAM 20 via the RF unit 14, the baseband modulating/demodulating unit 16, and the protocol control unit 18. In step S102, the MAC header 62 of the routing packets A and B is analyzed by the analyzing unit 128 of the CPU 22.

In step S104, the analyzing unit 128 of the CPU 22 determines whether the final node address in the MAC header 62 corresponds to the address of node 5. Because the final node address in the MAC header 62 is the address of node 5 (YES in step S104), the process advances to step S118.

In step S118, the receiving wireless communications apparatus 200 stands by for a duration of time (step S118 and step S208) in order to receive all of the routing packets for all routes. Thereafter, the power information acquiring unit 122 of the CPU 22 acquires the power consumption information for the routes (the route of nodes 1, 2, 4, and 5, and the route of nodes 1, 3, 4, and 5). Specifically, the power information acquiring unit 122 acquires the power consumption information (=460 mW) attached to the routing packet A and the power consumption information (=400 mW) attached to the routing packet B.

In step S120, the decision unit 124 determines the routing packet having the minimum power consumption by comparing the power consumption information acquired from the routing packets A and B by the power information acquiring unit 122.

For example, the power consumption information attached to the routing packet A indicates 460 mW, while the power consumption information attached to the routing packet B indicates 400 mW. Thus, the decision unit 124 selects the routing packet B as the routing packet having the minimum power consumption. The decision unit 124 therefore determines that the route corresponding to the routing packet B (nodes 1, 3, 4, and 5) as the route via which a packet can be sent with the minimum power consumption (step S124). The route with the minimum power consumption is indicated by the route information contained in the routing packet B.

In step S126, the protocol control unit 8 creates a route-determination packet indicating that the route has been selected. The route-determination packet is used for notifying the interposed wireless communications apparatuses in the selected route. In step S128, the transceiver unit 2 transmits the route-determination packet.

The route-determination packet is transferred back to node 1 via the selected route, i.e., via nodes 4 and 3. Thus, the transceiver unit 2 of node 4 transfers the route-determination packet to node 3 (steps S212 through S216).

Real Data Transmit Step

Figure 9:
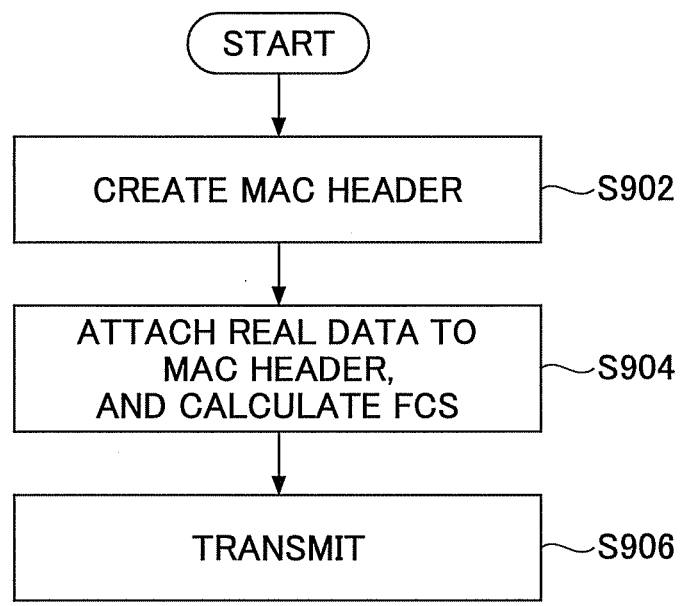
FIG. 9 is a flowchart of a process for transmitting a real data packet.

FIG. 9 is a flowchart of a real data transmit process in which real data (such as image data) is transmitted by node 1 via the route determined by the above-described route-determining process. The flow of FIG. 9 is similar to the flow of FIG. 3 with the exception that steps S6, S8, and S12 of the latter are omitted.

In step S902, the CPU 22 creates the MAC header 62. Alternatively, the MAC header 62 created in the route-determining process and then stored in the RAM 20 may be used in this step. In step S904, the CPU 22 attaches real data (image data) to the MAC header and calculates a FCS (frame check sequence). In step S906, the FCS is attached to the real data, thus generating a real data packet. The packet is transmitted by the transceiver unit 12.

In step S218, the transmitting wireless communications apparatus 100 (node 1) transmits the real data packet to node 3 from which node 1 received the route-determination packet. In step S220, node 3 transmits the received real data packet to node 4 from which node 3 received the route-determination packet. In step S222, node 4 transmits the received real data packet to node 5 from which node 4 received the route-determination packet. In this way, node 5 (receiving wireless communications apparatus 200) receives the image data from the transmitting wireless communications apparatus 100 (node 1). In step S224, node 5 transmits an ACK signal to node 4, indicating a safe reception of the real data packet. In step S226, node 4 transfers the ACK signal received from node 5 to node 3 from which node 4 received the real data packet. In step S228, node 3 transfers the ACK signal received from node 4 to node 1 that transmitted the real data packet. By receiving the ACK signal, node 1 recognizes that the real data packet has been safely received by node 5.

Thus, in accordance the present embodiment, a route with the minimum power consumption can be determined from a plurality of routes, and the transmitting wireless communications apparatus 100 can transmit real data, such as image data, via the determined route. Thus, consumption of power required for transmitting real data can be minimized.

The operating unit 82 may convert transmission power information into power consumption information for the following reason. The transmission power information is determined by equation (1). Transmission power is not dependent on the type of the transceiver unit 12 of the interposed wireless communications apparatus. Transmission power may not be dependent on the type of an antenna of the interposed wireless communications apparatus.

On the other hand, power consumption is dependent on the type of the transceiver unit 12 of the interposed wireless communications apparatus. Thus, power consumption information can be appropriately determined by the operating unit 82 even if the type of the transmitting wireless communications apparatus is changed.

The power consumption information may be attached at the end of the routing packet as illustrated in FIG. 4 for the following reason. In accordance with the present embodiment, all of the interposed wireless communications apparatuses 50 in the network are capable of processing the power consumption information. However, if one or more of the interposed wireless communications apparatuses are not capable of processing the power consumption information, and if the power consumption information is attached at a location other than at the end of the routing packet (such as next to the MAC header 62), the power consumption information cannot be processed, resulting in an error in the one or more wireless communications apparatuses.

By attaching the power consumption information at the end of the routing packet, the interposed wireless communications apparatus 50 that is not capable of processing power consumption information can perform a process by deleting the power consumption information. Thus, no error is caused in the interposed wireless communications apparatuses 50 not capable of processing power consumption information in a network.

Figure 10:
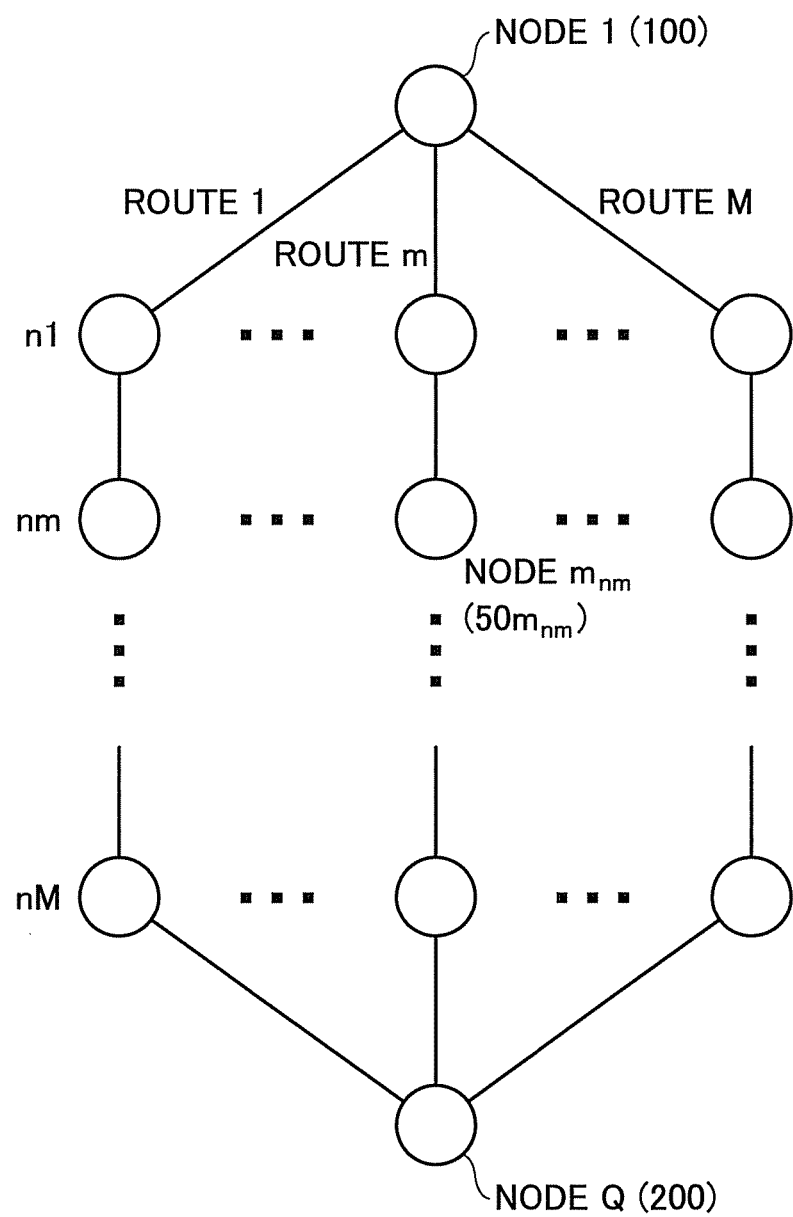
FIG. 10 illustrates a mesh network according to another embodiment of the present invention.

FIG. 10 illustrates a network having routes 1, . . . , m, . . . , and M, where M is an integer of 3 or more. Each of the routes includes n1, . . . , nm, . . . , nM interposed wireless communications apparatuses 50. Hereafter, the m-th interposed wireless communications apparatus 50 in the route m is designated as "$50m_{nm}$" or "node $m_{nm}$".

The packet generating unit (header/routing info generating unit 132 and FCS generating unit 87 in FIG. 2) of the transmitting wireless communications apparatus 100 generates routing packets Pm(1, . . . , m, . . . , M) for each of the M routes (in steps S2 and S4 in FIG. 3). Thus, the packet generating unit generates M packets.

After step S6 (FIG. 3), the operating unit 82 of the transmitting wireless communications apparatus 100 generates power consumption information $70m$ for each of the M routes, indicating the amount of power consumed by transmitting the packet to the next wireless communications apparatus 50. The routing packet Pm to which the power consumption information $70m$ is attached is transmitted by the transceiver unit 2.

Next, a process performed by the interposed wireless communications apparatus $50m_{nm}$ (node $m_{nm}$) after steps S106, S108, and S110 in FIG. 7 is described. In step S112, a total of power consumed by the transmission of the routing packet Pm from node 1 to node $m_{nm}$ is stored in the second register 90. Then, node $m_{nm}$ determines the power consumption for transmitting the routing packet Pm to the next node $m_{nm+1}$. The thus determined power consumption is added by the updating unit 826 to the power consumption value stored in the second register, thereby updating the power consumption information 70 of the routing packet Pm. The subsequent process is similar to the process of steps S114 and S116 and is therefore not described herein.

Thus, when the packet is transmitted from node 1 to node Q via any one of the routes 1, . . . , m, . . . , and M, each of the interposed wireless communications apparatuses successively adds a power consumption value. Namely, the updating unit 826 of each interposed wireless communications apparatus (see FIG. 2) adds the value of power consumption by the previous transmission of the routing packet to the power consumption for transmitting the routing packet to the next interposed wireless communications apparatus or the receiving wireless communications apparatus.

In accordance with the present embodiment, the transmitting wireless communications apparatus 100, the receiving wireless communications apparatus 200, and the interposed wireless communications apparatuses 50 include all of the functional units illustrated in FIG. 2. Alternatively, one or more of the nodes may not include all of the illustrated functional units as needed.

In accordance with an embodiment, the transmitting wireless communications apparatus 100 (node 1) may be configured to broadcast the routing packet including the power consumption information. Transmission power used for calculating the power consumption information may be set between the transmitting wireless communications apparatus 100 and one of the interposed wireless communications apparatuses that can wirelessly communicate with the transmitting wireless communications apparatus 100.

The interposed wireless communications apparatuses (nodes 2 and 3) that received the routing packet via broadcasting may then broadcast the routing packet. When broadcasting the routing packet, the interposed wireless communications apparatuses (nodes 2 and 3) each adds to the power consumption information in the routing packet a power consumption value calculated by using a transmission power value that is set between the interposed wireless communications apparatus (nodes 2 and 3) and one of the other interposed wireless communications apparatuses that can wirelessly communicate with nodes 2 and 3 or the receiving wireless communications apparatus.

The interposed wireless communications apparatus (node 4) that received the routing packet broadcast by the interposed wireless communications apparatuses (nodes 2 and 3) broadcasts the routing packet. When broadcasting the routing packet, the interposed wireless communications apparatus (node 4) adds to the power consumption information in the routing packet a power consumption value calculated by using a transmission power value set between the wireless communications apparatus (node 4) and one of the other interposed wireless communications apparatuses that can wirelessly communicate with the wireless communications apparatus (node 4) or the receiving wireless communications apparatus.

The receiving wireless communications apparatus 200 receives the routing packet broadcast by the interposed wireless communications apparatus (node 4). The receiving wireless communications apparatus 200 determines a route based on the received routing packet. For example, the route may be determined based on the power consumption information in the routing packet, such that the power consumption can be minimized. The receiving wireless communications apparatus 200 then transmits a route-determination packet including the route information determined based on the routing packet. The route-determination packet is transferred between the interposed wireless communications apparatuses included in the route information and eventually received by the transmitting wireless communications apparatus 100.

Figure 11:
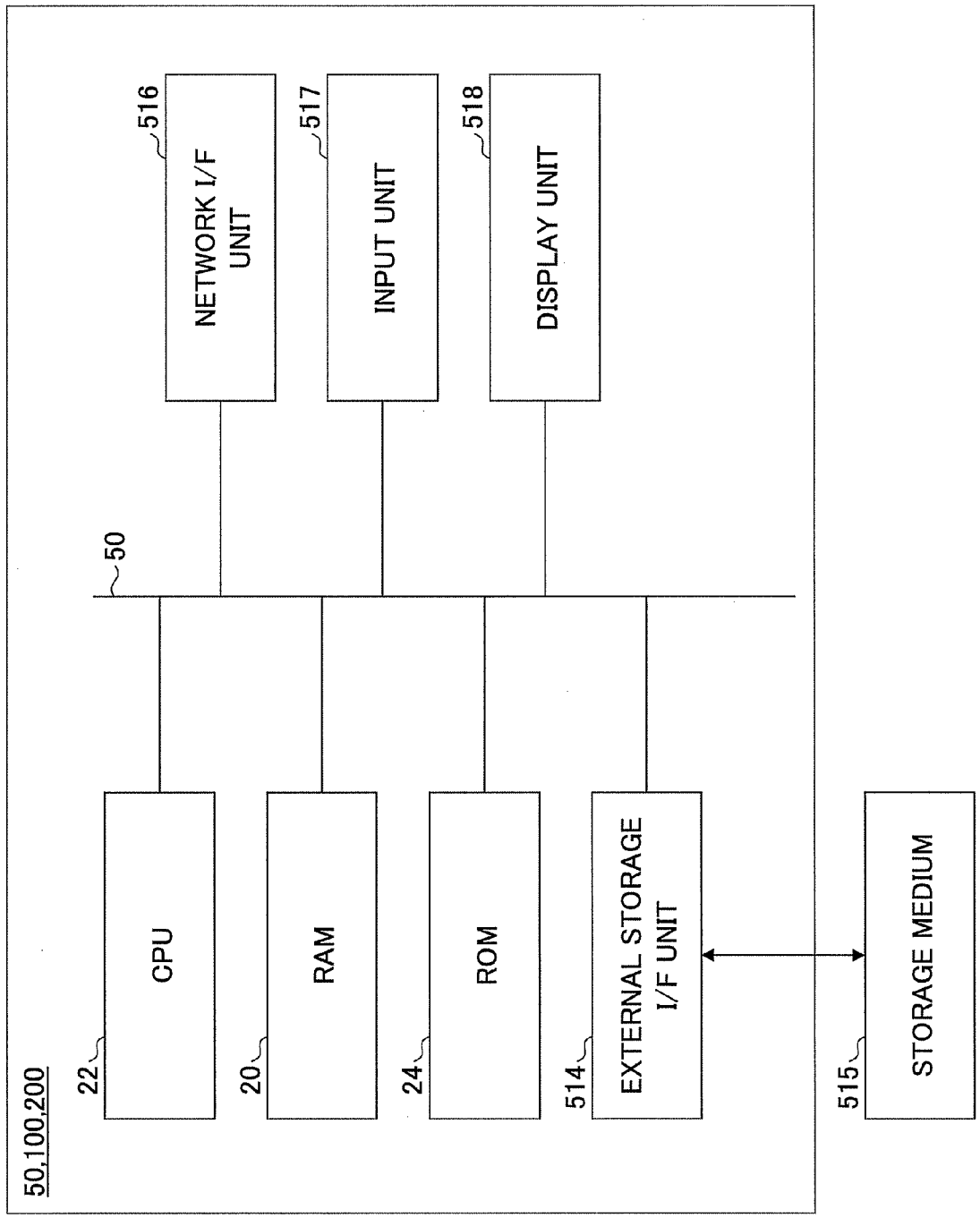
FIG. 11 is a block diagram of the wireless communications apparatus according to an embodiment of the present invention.

FIG. 11 is a block diagram of a hardware structure of the transmitting wireless communications apparatus 100, the receiving wireless communications apparatus 200, or the wireless communications apparatus 50 according to the present embodiment. The structure includes a CPU 22, a RAM 20, a ROM 24, a network I/F unit 516, an input unit 517, a display unit 518, and an external storage I/F unit 514.

The CPU 22 is an operating unit configured to control the various units of the apparatus or a computer and perform various data operations or processes. The CPU 22 may be configured to perform a process in accordance with a program stored in the RAM 20. The CPU 22 may receive data from an input unit or a storage unit, operate or process the data, and then output resultant data to an output unit or the storage unit.

The RAM 20 is a storage unit in which an OS (operating system) or an application software program executed by the CPU 22 and various data may be saved or temporarily stored. The ROM 24 is another storage unit in which data related to the application software may be stored.

The network I/F unit 516 provides an interface for enabling communication with a network such as a LAN (Local Area Network) or a WAN (Wide Area Network) which may be set up using wired or wireless data transmission routes. Thus, the network I/F unit 516 enables communications with other wireless communications apparatuses or the like.

The input unit 517 and the display unit 518 may include an LCD (Liquid Crystal Display) having key switches (hardware keys) and a touch panel function. The touch panel function may include software keys for a graphical user interface (GUI). The input unit 517 and the display unit 518 may include a display/input unit configured to provide a user interface (UI) when a user utilizes a function of the wireless communications apparatus.

The external storage I/F unit 514 provides an interface with a recording medium 515 (such as a flash memory) which may be connected to the wireless communications apparatus via a data transmission route such as a USB (Universal Serial Bus) cable.

A program stored in the recording medium 515 may be installed in the wireless communications apparatus 100, 200, or 50 via the external storage I/F unit 514, so that the installed program can be executed by the wireless communications apparatus, which may include a PC.

Figure 12:
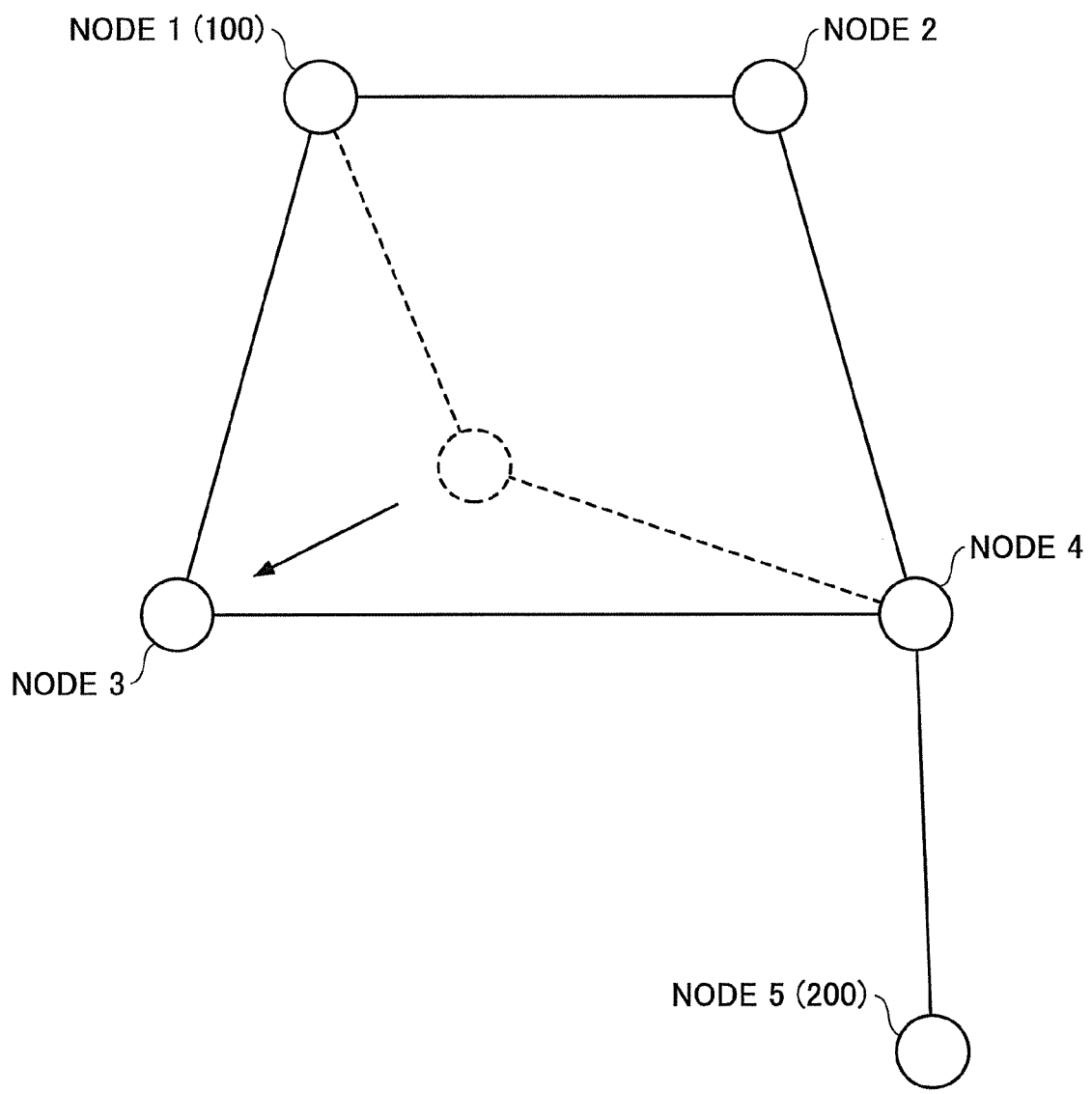
FIG. 12 illustrates an example of a mesh network.

FIG. 12 illustrates a mesh network including nodes 1 through 5 (wireless communications apparatuses). Initially, the route passing through nodes 3 and 4 may be determined by transmitting a routing packet and acquiring power consumption information contained in the route-determination packet. The route may be selected because the route has the least power consumption. However, one or more of the routes may be moved after such route determination. If the transmission of real data is continued using the selected route when a node has moved, power consumption may increase.

In the example of FIG. 12, node 3 has been moved away from nodes 1 and 4 after the setting of the route. In this case, the transmission power as calculated in accordance with equation (1) may increase for transmitting the real data both from node 1 to node 3 and from node 3 to node 4. As a result, power consumption increases. Thus, it is more preferable to select another route that requires lower power consumption than continue with the current route having the increased power consumption.

Figure 13:
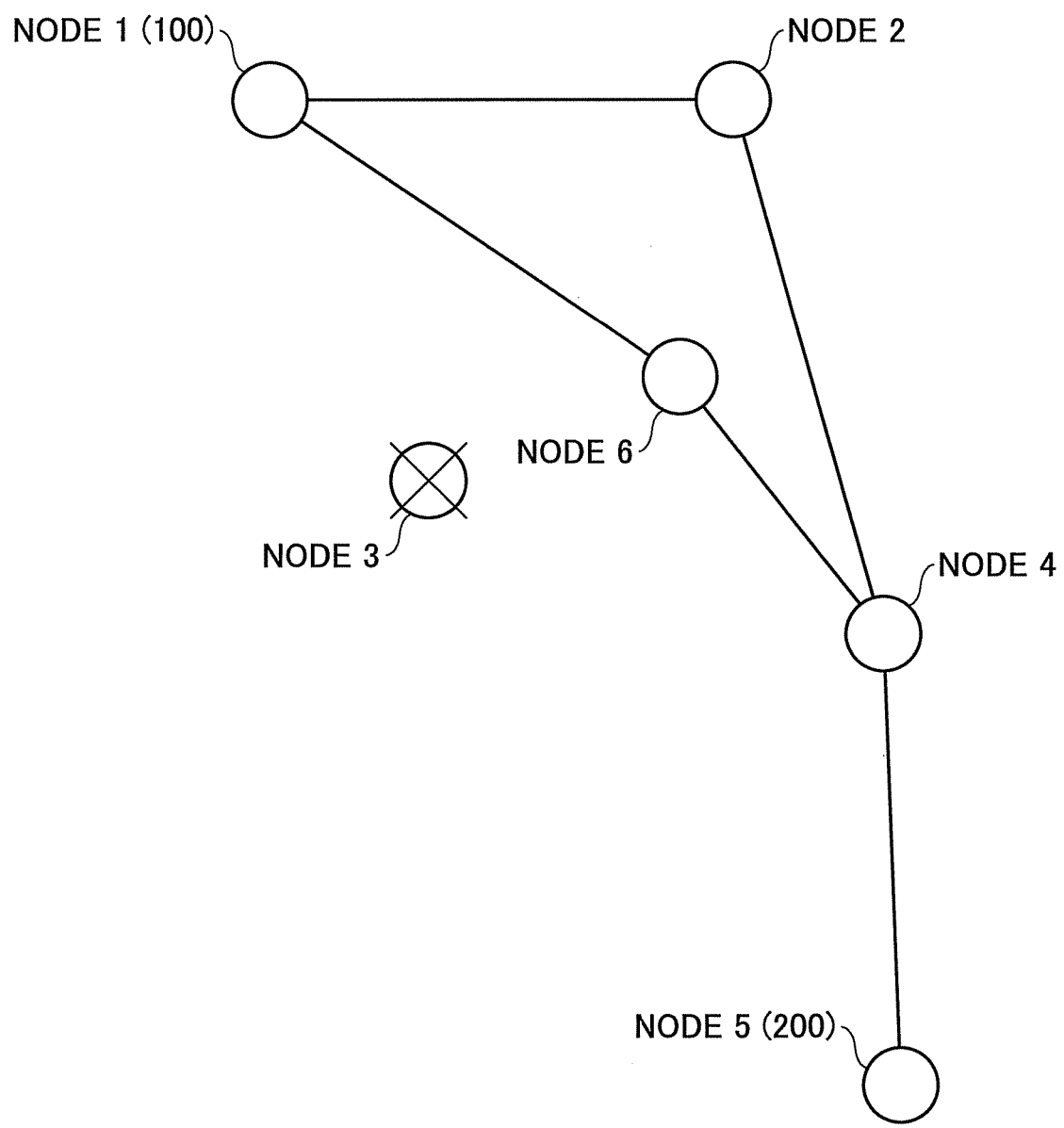
FIG. 13 illustrates another example of a mesh network.

FIG. 13 illustrates an example in which a wireless communications apparatus in a selected route is replaced with another wireless communications apparatus. At the time of route setting, the selected route may include node 3. The route may be determined by transmitting a routing packet and acquiring power consumption information contained in the route-determination packet. For example, the route via nodes 3 and 4 is selected because the route has the least power consumption. However, one or more of the interposed wireless communications apparatuses may become unable to communicate due to some failure. In such a case, the incapacitated node may be replaced with a node located nearby for transferring the real data. In the example of FIG. 13, the route that has been originally set included node 3. However, because node 3 became unable to communicate after the route setting, node 6 is used instead for transferring data from node 1 to node 4, thus modifying the route. When transmission of the real data is continued with the modified route, power consumption may increase.

When node 6 is included in the route, the transmission power that is set for transmitting the real data as calculated in accordance with equation (1) may increase for transmitting the real data both from node 1 to node 6 and from node 6 to node 4. When the transmission power thus increases, the power consumption also increases.

Thus, in accordance with the present embodiment, each wireless communications apparatus attaches power consumption information to the real data that is transmitted after the route setting when transmitting the real data. The receiving wireless communications apparatus 200 determines whether to request routing (route-determining process) by the transmitting wireless communications apparatus 100 based on the power consumption information contained in the received real data.

Figure 14:
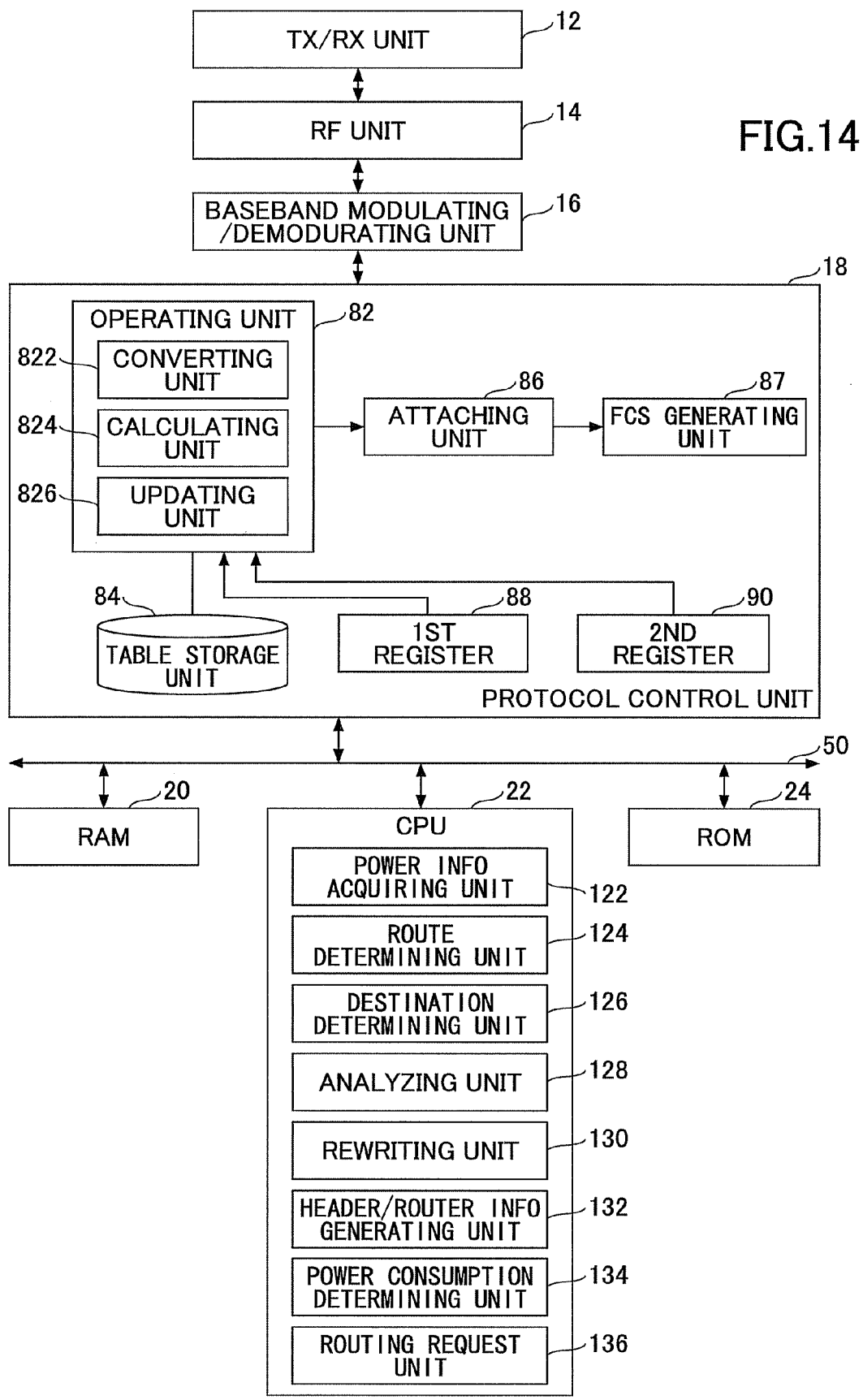
FIG. 14 is a functional block diagram of wireless communications apparatus according to an embodiment of the present invention.

FIG. 14 is a block diagram of the wireless communications apparatus according to the present embodiment. The wireless communications apparatus is similar to the apparatus of FIG. 2 with the exception that a power consumption determination unit 134 and a routing requesting unit 136 are additionally provided.

When the wireless communications apparatus is the receiving wireless communications apparatus 200, the power consumption determination unit 134 determines whether routing should be performed based on the power consumption information contained in the real data packet received from an interposed wireless communications apparatus. For example, the power consumption determination unit 134 retains power consumption information ("reference power consumption") when a route to be used is determined based on the routing packet. Upon reception of real data from the interposed wireless communications apparatus, the power consumption determination unit 134 determines whether the power consumption information contained in the real data is greater than the reference power consumption. The reference power consumption may include a margin so that routing (route-determining process) is not conducted too frequently. For example, when the amount of movement of the node is small, the power consumption may not be changed much from the reference power consumption. Similarly, when the wireless communications apparatus that is rendered incapable of performing communications is replaced with a nearby wireless communications apparatus for relaying data, the power consumption may not be changed much from the reference power consumption.

When the power consumption information value contained in the real data is greater than the reference power consumption, the power consumption determination unit 134 determines that routing should be conducted because the power consumption by the network as a whole can be expected to increase. The reference power consumption may include a margin, as mentioned above. On the other hand, when the power consumption value contained in the real data is equal to or less than the reference power consumption which may include a margin, the power consumption determination unit 134 may determine that routing should not be conducted because the power consumption of the network as a whole is not increased. Upon determining that routing should be conducted, the power consumption determination unit 134 instructs the routing requesting unit 136 to conduct the route-determination process.

The routing requesting unit 136, upon reception of a routing instruction from the power consumption determination unit 134, requests routing packets from the transmitting wireless communications apparatus 100. For example, the routing requesting unit 136 is configured to transmit a packet for requesting the transmission of the routing packets.

Upon reception of the packet requesting the transmission of the routing packets from the receiving wireless communications apparatus 200, the transmitting wireless communications apparatus 100 transmits the routing packets. Based on the routing packets, a route that would minimize power consumption is set.

Figure 15:
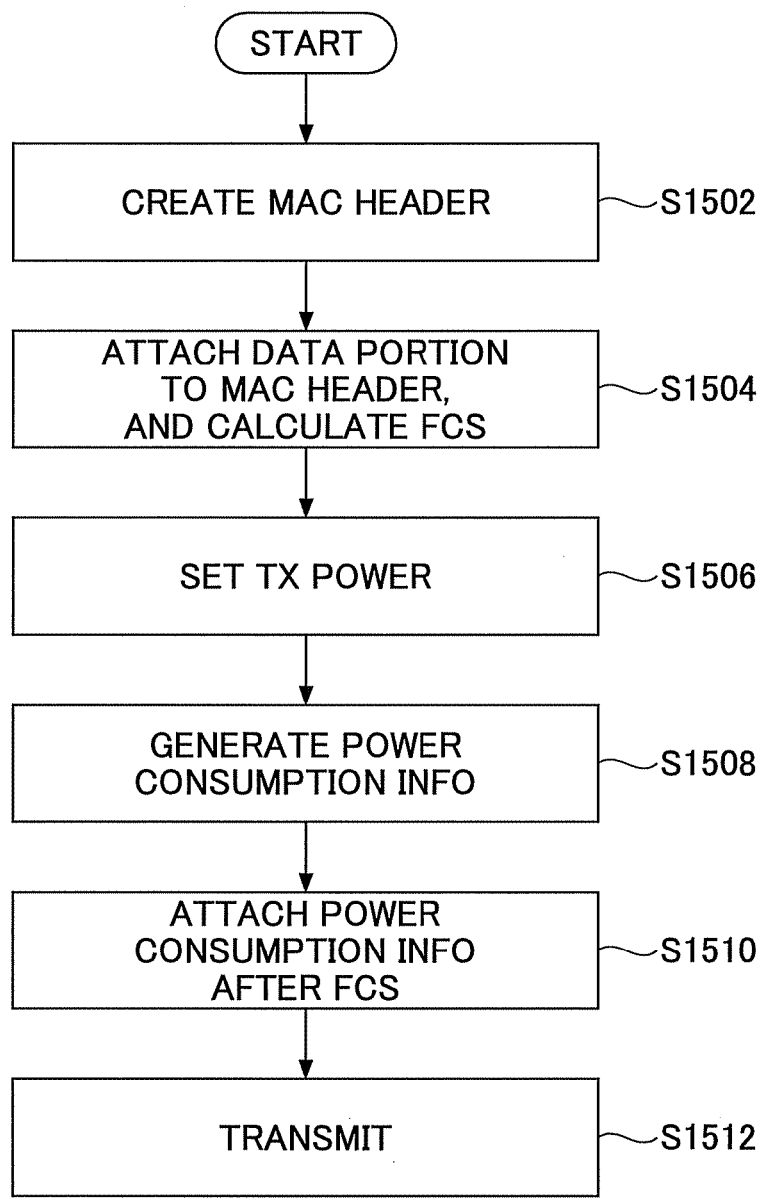
FIG. 15 is a flowchart of an operation of the transmitting wireless communications apparatus.

FIG. 15 is a flowchart of an operation of the transmitting wireless communications apparatus 100 according to the present embodiment. In step S1502, the header/routing info generating unit 132 of the CPU 22 generates the MAC header 62 on the RAM 20. The MAC header 62 includes the address of the next node, as described above with reference to FIG. 4. The MAC header 62 may also include the address of the final node (receiving wireless communications apparatus 200). The "next node" refers to one or more of the interposed wireless communications apparatuses capable of communicating with the current node that are included in the route that has been set, or the receiving wireless communications apparatus.

The header/routing info generating unit 132 of the CPU 22 generates real data 66 on the RAM 20 and adds the real data 66 to the MAC header 62. Next, in step S1504, the FCS generating unit 87 of the protocol control unit 18 calculates the FCS 68. In step S1504, the header/routing info generating unit 132 of the CPU 22 generates the MAC header 62 and the real data 66. The FCS generating unit 87 of the protocol control unit 18 generates the FCS 68.

In step S1506, the CPU 22 sets a transmission power value in the first register 88 of the protocol control unit 18. The protocol control unit 18 then notifies the RF unit 14 of the transmission power value stored in the first register 88. In step S1508, the operating unit 82 of the protocol control unit 18 generates power consumption information to be attached to the real data 66 that is to be relayed to the next node. The operating unit 82 may generate the power consumption information by the above-described first and/or the second method.

The MAC header 62 and the real data 66 generated on the RAM 20 are transmitted to the protocol control unit 18. In step S1510, the attaching unit 86 attaches the power consumption information 70 after the FCS 68. Namely, the power consumption information 70 is included in the real data packet, which is then transmitted to the baseband modulating/demodulating unit 16. The baseband modulating/demodulating unit 16 subjects the real data packet to an OFDM (orthogonal frequency-division multiplexing digital modulation) process. Thereafter, the routing packet A is transmitted by the transceiver unit 12 in step S1512.

Figure 16:
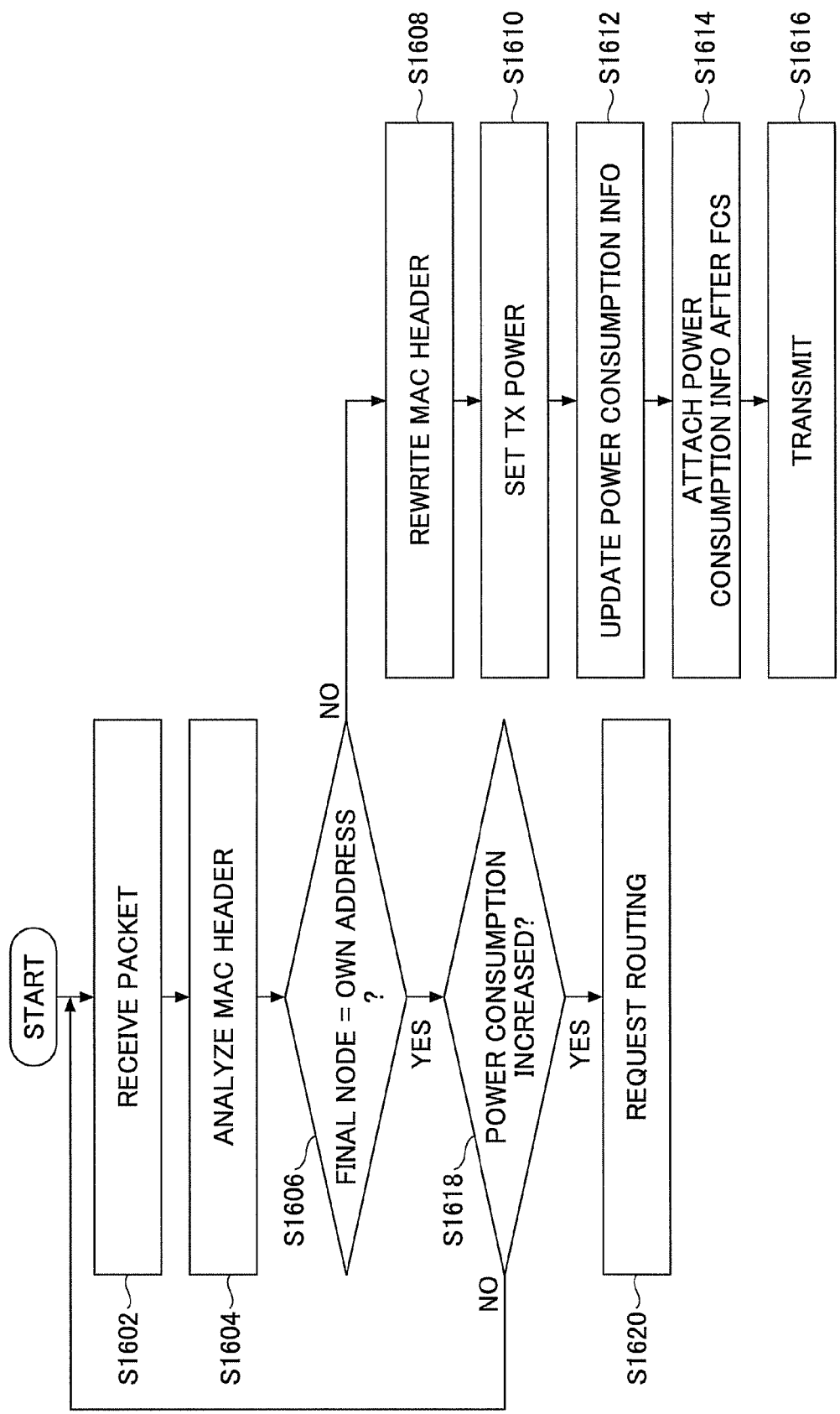
FIG. 16 is a flowchart of an operation of the interposed wireless communications apparatus or the transmitting wireless communications apparatus.

FIG. 16 is a flowchart of an operation of the interposed wireless communications apparatus 50 and the transmitting wireless communications apparatus 100. In step S1602, the interposed wireless communications apparatus 50 receives the real data packet from the transmitting wireless communications apparatus 100 via the transceiver unit 12. The real data packet is then fed to the RF unit 14. The real data packet is then stored in the RAM 20 via the baseband modulating/demodulating unit 16 and the protocol control unit 18.

In step S1604, the analyzing unit 128 of the CPU 22 analyzes the MAC header 62 contained in the real data packet. In step S1606, the destination determining unit 126 of the CPU 22 determines whether the address of the final node corresponds to the address of the interposed wireless communications apparatus 50.

If the address of the final node does not correspond to the address of the interposed wireless communications apparatus 50 (NO in step S1606), the power information acquiring unit 122 of the CPU 22 acquires the power consumption information 70 in the real data packet stored in the RAM 20, and stores the power consumption information 70 in the second register 90.

In step S1610, the CPU 22 sets a transmission power value in the first register 88 within the protocol control unit 18. The transmission power value is the electric power required for wirelessly transmitting the real data packet to the next node. The operating unit 82 generates power consumption information based on the transmission power information stored in the first register 88. The power consumption information may be generated by the above-described first or second method.

The updating unit 826 of the operating unit 82 adds the power consumption value generated by the operating unit 82 to the power consumption value stored in the second register 90. The updating unit 826 then updates the power consumption information 70 with the calculated value of power consumption (step S1612). In other words, the operating unit 82 of the interposed wireless communications apparatus generates the power consumption information by adding the power consumption value generated from the transmission power required for transmitting the real data packet from the transmitting wireless communications apparatus 100 to the interposed wireless communications apparatus, to the power consumption value generated from the transmission power required for transmission of the real data packet from the interposed wireless communications apparatus to the next interposed wireless communications apparatus or the receiving wireless communications apparatus.

In step S1614, the attaching unit 86 attaches the updated power consumption information 70 after the FCS 68. Namely, the power consumption information 70 is included in the real data packet. The real data packet to which the updated power consumption information is attached is processed by the baseband modulating/demodulating unit 16, converted into a wireless signal by the RF unit 14, and then transmitted by the transceiver unit 12 (step S1616).

If it is determined in step S1606 that the address of the final node corresponds to the address of the intermediate wireless communications apparatus (YES in step S1606), the power consumption determination unit 134 of the CPU 22 determines whether the power consumption value contained in the real data packet is increased over the power consumption value at the time of initial route setting (step S1608). If the power consumption value contained in the real data packet is increased over the power consumption value at the time of initial route setting (YES in step S1618), the power consumption determination unit 134 determines that a routing request should be made. Specifically, the power consumption determination unit 134 instructs the routing requesting unit 136 to send a routing request to the transmitting wireless communications apparatus 100. Upon reception of the routing request instruction from the power consumption determination unit 134, the routing requesting unit 136 of the CPU 22 transmits a routing requesting packet to the transmitting wireless communications apparatus 100.

On the other hand, if it is determined in step S1618 that the power consumption value contained in the real data packet is not more than the power consumption at the time of initial route setting (NO in step S1618), the process returns to step S1602 because the power consumption has not increased and there is no need for additional routing.

In accordance with the present embodiment, the value of the reference power consumption may be set by a user. In this way, it can be determined whether routing should be conducted in accordance with user requests. For example, when it is desired to reduce power consumption even if routing is conducted very frequently, the reference power consumption value may be set to a low value. Conversely, when it is desired to reduce the time required for routing even if power consumption is increased somewhat, the reference power consumption value may be set to a high value. Thus, the reference power consumption value can be set to an appropriate value depending on the environment in which the wireless communications apparatus is used, so that an appropriate route can be selected.

In accordance with the present embodiment, the wireless communications apparatus may include a display unit for displaying power consumption information. The display unit allows the user to monitor power consumption, thereby facilitating the management of the network. For example, the number of the wireless communications apparatuses in a network can be increased or decreased depending on the amount of power consumption.

The wireless communications apparatus may also include a notifying unit for issuing a notification when it is determined that a routing is to be conducted. Further, the wireless communications apparatus may include a routing initiating unit for initiating the routing process. For example, in response to the notification that a routing is to be conducted, a user may or may not instruct the routing initiating unit to initiate a routing.

Although this invention has been described in detail with reference to certain embodiments, variations and modifications exist within the scope and spirit of the invention as described and defined in the following claims.

The present application is based on Japanese Priority Applications No. 2009-262237 filed Nov. 17, 2009 and No. 2010-138332 filed Jun. 17, 2010, the entire contents of which are hereby incorporated by reference.

What is claimed is:

1. A wireless communications apparatus in a network of a plurality of wireless communications apparatuses connected by a plurality of routes, the wireless communications apparatus comprising:
 a receiving unit configured to receive a packet to which power consumption information is attached, the power consumption information indicating power consumption for transferring the packet in the network;
 an acquiring unit configured to acquire the power consumption information attached to the packet received by the receiving unit;
 a decision unit configured to determine one of the plurality of routes that has the minimum power consumption by comparing the power consumption information acquired by the acquiring unit regarding the one route with that of another of the routes in the network;
 a power consumption determination unit configured to determine whether the power consumption indicated by the power consumption information acquired by the acquiring unit is greater than a predetermined threshold value; and
 a routing requesting unit configured to request one of the plurality of wireless communications apparatuses that transmitted the packet to perform a routing process when the power consumption determination unit determines that the power consumption indicated by the power consumption information is greater than the predetermined threshold value.

2. The wireless communications apparatus according to claim 1, wherein the predetermined threshold value is associated with the power consumption corresponding to the route determined by the decision unit.

3. The wireless communications apparatus according to claim 1, further comprising:
 a notifying unit configured to notify a user about the routing process requested by the routing requesting unit.

4. The wireless communications apparatus according to claim 1, further comprising a display unit configured to display the power consumption information acquired by the acquiring unit.

5. A network communications system having a transmitting wireless communications apparatus, a receiving wireless communications apparatus, and a plurality of interposed wireless communications apparatuses;
 wherein the transmitting wireless communications apparatus includes:
  a packet generating unit configured to generate a packet for each of a plurality of routes in the network;
  an operating unit configured to generate power consumption information for each of the plurality of routes, the power consumption information indicating power consumption for transmitting the packets;
  an attaching unit configured to attach the power consumption information to the packets; and
  a transmit unit configured to transmit the packets to which the power consumption information is attached via the corresponding routes, and the receiving wireless communications apparatus includes:

a receiving unit configured to receive the packets to which the power consumption information is attached, the power consumption information indicating power consumption for transferring the corresponding packets in the network;

an acquiring unit configured to acquire the power consumption information attached to the packets received by the receiving unit;

a decision unit configured to determine one of the plurality of routes that has the minimum power consumption by comparing the power consumption information acquired by the acquiring unit regarding the one of the plurality of routes with that of another of the routes in the network;

a power consumption determination unit configured to determine whether the power consumption indicated by the power consumption information acquired by the acquiring unit is greater than a predetermined threshold value; and a routing requesting unit configured to request one of the plurality of wireless communications apparatuses that transmitted the packets to perform a routing process when the power consumption determination unit determines that the power consumption indicated by the power consumption information is greater than the predetermined threshold value.

6. The network communications system according to claim 5, wherein the operating unit generates the power consumption information based on transmission power information for transmitting the packets.

7. The network communications system according to claim 5, wherein the attaching unit attaches the power consumption information at the end of the packets.

* * * * *